United States Patent [19]
Bechara et al.

[11] 3,717,676
[45] Feb. 20, 1973

[54] SYNTHESIS OF OXYCARBOXYLIC ACID SALTS

[75] Inventors: Ibrahim S. Bechara, Newcastle, Del.; George B. DeLaMater, Media; Barton Milligan, Ardmore, both of Pa.

[73] Assignee: Air Products and Chemicals, Inc., Wayne, Pa.

[22] Filed: Aug. 20, 1971

[21] Appl. No.: 173,648

[52] U.S. Cl..............................260/531 C, 260/535 P
[51] Int. Cl...............................................C07c 51/26
[58] Field of Search.......................260/535 P, 531 C

[56] References Cited

UNITED STATES PATENTS

| | | | |
|---|---|---|---|
| 2,183,853 | 12/1939 | Haussmann et al. | 260/531 R |
| 2,886,590 | 5/1959 | Montgomery et al. | 260/531 R |

*Primary Examiner*—Lorraine A. Weinberger
*Assistant Examiner*—Paul J. Killos
*Attorney*—B. Max Klevit et al.

[57] ABSTRACT

Production of the oxycarboxylic acid alkali metal salts from the oxysubstituted or polyoxy-substituted primary alcohols and alkali metal hydroxide in the presence of a catalyst comprising cadmium is effected in the presence of low hydrogen partial pressure and strictly controlled water concentration. The synthesis of sodium oxydiacetate from diethylene glycol and concentrated aqueous caustic solution in the presence of CdO is particularly effective.

7 Claims, No Drawings

SYNTHESIS OF OXYCARBOXYLIC ACID SALTS

BACKGROUND OF THE INVENTION

1. Field of the Invention

This invention is directed to the production of alkali metal salts of oxysubstituted carboxylic acids and is particularly directed to the preparation of the alkali metal salts of the oxypolycarboxylic acids from alkylene oxide oligomers.

2. Prior Art

While the caustic dehydrogenation of amino alkanols is shown in the art, no art specific to the caustic dehydrogenation of the alkylene oxide oligomers has been located.

SUMMARY OF THE INVENTION

In accordance with this invention the alkali metal salts of oxypolycarboxylates are prepared by the alkali metal hydroxide dehydrogenation of oxysubstituted or polyoxy-substituted primary alcohols at conditions including a temperature in the range of 375° to 450° F., a total pressure ranging from 75 to 110 psig at 375° F. to 125 to 200 psig at 450° F. and with a hydrogen partial pressure of less than 25 percent of the total pressure, and in the presence of water in an amount in the range of 20 to 60 percent by weight of the total weight of the reaction system.

Typical of the oxysubstituted and polyoxy-substituted primary alcohols are diethylene glycol; triethylene glycol; tetraethylene glycol; ethylene glycol monomethyl ether; the di- and triethylene glycol monomethyl- or mono-higher alkyl ethers; the isooctyl ether of ethylene glycol; 1,2,3-trishydroxyethyleneoxypropane or the higher ethoxylated glycerines of this type; or 1,3,1',1"2,2-dimethyl propane.

For purposes of simplification the description is concerned with the conversion of diethylene glycol to the sodium oxydiacetate salt. However, it is understood that depending on the alcohol reactant and the type of alkali metal hydroxide one can obtain the appropriate alkali metal salt of an oxycarboxylic acid, such as but not limited to oxybis(ethyleneoxy)diacetic acid; or the tris-alkali metal salt of 1,2,3-tris-carboxymethyloxypropane; or alkali metalmethoxyacetate; or the alkali metal salt of methoxyethyleneoxyacetic acid.

The alkali metal may be any of the alkali metals with the preference being sodium for reasons including ecological reasons, relatively low cost, and a high order of effectiveness in the dehydrogenation reaction.

The catalyst employed comprises any suitable source providing as a moiety thereof cadmium in the plus two oxidation state. The amount of catalyst employed is in the range of 0.2 to 20 gram atoms of cadmium per 100 mols of the alcohol reactant. Such catalyst may be CdO or the chloride, nitrate, sulfate, organic acid salts or other. Particular advantage has been found in that the cadmium-containing composition recovered from one run is active and advantageously reused. The presence of cadmium as the metal is preferably avoided since it, per se, exhibits substantially no catalytic activity.

In general the minimum amount of water is in the order of 20 percent and preferably is employed in an amount in the range of 25 to 35 percent by weight of the total. The amount of alkali metal hydroxide employed, while theoretically sufficient in stoichiometric amount for the complete reaction, has been found to be required in an amount of at least 5 percent in excess of stoichiometry and up to approximately 30 percent in excess. Amounts in excess thereof adversely affect the water content requirement and are therefore to be avoided.

The amount of water employed should be sufficient to provide fluid system in the reaction zone without in any instance exceeding 60 percent of the total weight of the reactants present in the reaction zone.

The alkali metal salts prepared in accordance with this invention have a variety of uses among which the use as detergent builders is of particular interest. Among such products, the sodium salts produced by the reaction of ethylene oxide oligomers are particularly desirable because of their biodegradability and degradation to products having little or no phytonutrient characteristics.

DETAILED DESCRIPTION

The more important contributions in accordance with this invention concern the control of the hydrogen partial pressure in the reaction zone during the alkali metal hydroxide dehydrogenation step as well as the maintenance of a minimum effective water concentration. The hydrogen partial pressure must be maintained at less than 25 percent of the total reactor pressure. This is necessary to prevent conversion of the catalyst to an inactive form, i.e., by reduction of the cadmium-containing catalyst to metallic cadmium, to prevent hydrogenolytic cleavage of the reactants and/or products, and particularly to obtain the maximum rate of reaction. The water content is required in minimum sufficiency to provide and maintain fluidity of the contents of the reaction zone in order that the reaction may proceed properly and efficiently. Due to the composition and nature of the reactants such minimum water concentration is about 20 percent by weight of the total reaction mix. In order to prevent hydrolytic cleavage of reactants and other deleterious side effects during the reaction the water content should not exceed 60 percent by weight, with the preferred amount of water being generally in the range of 25 to 35 percent by weight of the total weight of the reaction mix.

While the foregoing specific controls of the hydrogen partial pressure and water concentration are particularly noted, the operation within the previously described temperature and pressure conditions must be adhered to; otherwise the oxypolycarboxylate salts are decidedly less perferentially formed.

A method of operation found particularly effective in controlling both the hydrogen partial pressure and the water concentration in the reaction zone has been found to be a reflux type operation whereby the gaseous products of the reaction are permitted to leave the reaction area promptly and under control without undue loss of condensibles, particularly water. Condensed volatiles return promptly to the reaction zone and the total pressure of the reaction system can be readily controlled through adjustment of the vent line exhaust to provide a pressure within the described total pressure ranges. This results in a hydrogen partial pressure within the reaction zone substantially and desirably lower than the described permissible maximum while at the same time maintains the water concentration in the reaction zone substantially constant throughout the reaction period.

The methods and materials employed in accordance with this invention are exemplified in the following examples which are intended as informative and illustrative rather than limiting directives.

EXAMPLE I

To a 300 cc autoclave with a nickel liner were charged 10.6g (0.100 mole) diethylene glycol, 10.0g (0.250 mole) sodium hydroxide, 0.5g cadmium oxide, and 10.g water. The autoclave was heated at 390°F. for three hours during which time a pressure of 1,300 psig developed. The charge was dissolved in more water, filtered and examined by nuclear magnetic resonance. The NMR spectrum showed the presence of sodium oxydiacetate (possibly admixed with sodium glycolate) and sodium acetate as well as small amounts of two or more unidentified substances.

EXAMPLE II

To a 300 cc autoclave with a nickel liner were charged 16.0g (0.150 mole) diethyleneglycol, 20.0g (0.500 mole) sodium hydroxide, 20.g water and 2.0g cadmium oxide. The autoclave was connected to a reflux condenser and from thence to a proportional pressure controller set at 150 psig and was heated to 400°F. for a period of 5 hours. During this time a total of 0.58 mole of gas was liberated. The semi-pasty product was dissolved in more water and was filtered. The insoluble solid obtained weighed 3.0g and was shown to be cadmium oxalate. The filtrate was diluted with water to 100.0 ml. Titration of an aliquot with 12 M hydrochloric acid using a pH meter showed that 0.220 mole of sodium hydroxide remained in the original reaction mixture and that 0.272 mole of carboxylate anion (titrating in two pH ranges) had been produced. The NMR spectrum of the filtrate showed the presence of a trace of sodium acetate and 11 percent unconverted glycol groups as well as an 81 percent yield of glycolic acid type groups. Thus the selectivity was 91 percent. During the titration a precipitate formed during the neutralization of the first carboxylate group but redissolved during the neutralization of the second carboxylate group. Since the monosodium salt of oxydiacetic acid is known to be much less soluble than either the free acid or its disodium salt, this observation confirms the presence of the desired product, disodium oxydiacetate, in the original product mixture.

EXAMPLE III

A charge identical to that in the previous example was heated with the pressure controller set at 250 psig. By the time a pressure of 250 psig had been reached, an exotherm which carried the reaction mixture to a maximum of 740°F. had begun. In the course of 10 minutes, 0.5 ft$^3$ of gas was evolved. The nearly solid product was shown by its IR spectrum to be almost entirely sodium oxalate. The NMR spectrum of the water soluble portion showed it to consist primarily of sodium acetate. No glycolic acid type group was observed. The adverse effect of temperature and pressure outside the proper range is evident.

EXAMPLE IV

A 300 cc nickel lined autoclave was charged with 15.0g triethylene glycol, 10.0g sodium hydroxide, 10.g water and 0.5g cadmium oxide. The mixture was heated at 400°F. at autogenous pressure for about 5 hours. The product was diluted with 45g water and filtered. The filtrate was analyzed by NMR which showed the presence of acetate and other cleavage products as well as the desired product and unreacted glycol groups. Further analysis showed that 8 percent of the $C_2$ groups charged were converted to acetate and that 40 percent were converted to oxalate.

EXAMPLE V

To the 300 cc autoclave with nickel liner were charged 15.0g triethylene glycol, 10.0g sodium hydroxide, 10.g water and 1.0g cadmium oxide. The mixture was heated to 400°F. and the pressure was maintained at 220 psig by bleeding into a wet test meter. In the course of two hours 0.31 mole of gas was evolved. The product was diluted with 50 ml water and filtered. The residue of 1.7g consisted of cadmium oxalate. The NMR spectrum of the filtrate showed only a trace of acetate present. The spectrum further showed a conversion of 72 percent of the terminal hydroxyethyl groups to carboxymethyl groups with a selectively of 89 percent.

EXAMPLE VI

Similar experiments to Example V were carried out substituting for the cadmium oxide, other materials having alkaline redox potentials similar to cadmium, including such compounds of Fe(II), Sn(II) and Co(II). Gas evolution was observed in most cases, but only cleavage products, i.e., acetate and oxalate, were observed in significant amounts. Thus the substitution of other than the cadmium-type catalysts is contraindicated.

EXAMPLE VII

A charge of 29.1g tetraethylene glycol (0.15 mole), 20.g sodium hydroxide, 20g water and 2.0g cadmium oxide was heated at 400°F. and 100 psig for 5 hours. A total of 0.34 mole (58 percent of theory) gas was evolved. NMR analysis of the product indicated the presence of 0.144 mole (48 percent of theory) of carboxymethyl groups.

EXAMPLE VIII

To 100 parts of diethylene glycol are added 180 parts of 50 percent sodium hydroxide solution and as catalyst a cadmium (plus two oxidation state) complex recovered from a previous run and equivalent to 10 parts of cadmium oxide. The mixture is stirred and rapidly heated to 205°C. in a nickel lined reactor which has been fitted with a reflux condenser which is in turn connected to a proportional pressure controller set at 85 psig. Sufficient heat input to the reactor is provided to cause fast reflux of the reaction mixture. The initially rapid evolution of gas abates quickly, but heating is continued for two hours when the total evolution of gas is 100 percent of the theoretical.

The reaction mixture is rapidly cooled, diluted with water and then filtered. There are about 5–10 parts of solid, consisting primarily of cadmium oxalate. The remainder of the cadmium can be removed by the addition of the calculated amount of sulfide ion, either as hydrogen sulfide or as sodium sulfide, and filtration of the produced cadmium sulfide, or it can be removed by some other convenient means.

Nuclear magnetic resonance spectroscopy of the clear, faintly yellow filtrate using sodium acetate as an internal standard, shows that 5 percent of the hydroxyethyl groups charged are unconverted and that 90 percent are converted to carboxymethyl groups.

The addition of 130 parts of concentrated hydrochloric acid to the filtrate results in the precipitation of the monosodium salt of oxydiacetic acid in 85–90 percent yield.

Similar run conditions are found effective with other alcohols of the type herein defined and also with alkali metal hydroxides other than sodium hydroxide in the formation of the related alkali metal salt products. Runs at temperatures and/or pressures outside the described limits are found unsatisfactory for reasons such as failure to produce the desired products or in requiring an inordinate amount of time for reaction or in the production of excessive quantities of byproducts.

Obviously, many modifications and variations of the invention as hereinbefore set forth may be made without departing from the spirit and scope thereof, and therefore only such limitations should be imposed as are indicated in the appended claims.

What is claimed is:

1. The method of preparing an alkali metal salt of oxypolycarboxylate, comprising
   a. forming a reaction mixture of an oxysubstituted or polyoxysubstituted primary alcohol, an alkali metal hydroxide in an amount at least sufficient to provide at least 5 percent in excess of the stoichiometric equivalent of alkali metal requirement for complete salt-forming reaction with said alcohol, water in an amount in the range of 20 percent to 60 percent by weight of the weight of the reaction mixture and a catalyst comprising cadmium in the plus two oxidation state, said catalyst providing 0.2 to 20 gram atoms of cadmium per 100 mols of said alcohol;
   b. reacting said mixture at conditions effecting dehydrogenation of said alcohol and formation of said alkali metal salt, said conditions including a monotonical pressure-temperature relationship ranging from 75 to 110 psig at 375°F. to 125 to 200 psig at 450°F. wherein of the total pressure less than 25 percent is hydrogen partial pressure, and for a time of at least one hour and sufficient to effect substantially complete dehydrogenation with no substantial loss of water from the reaction; and
   c. recovering from such reaction as product as oxypolycarboxylate alkali metal salt.

2. The method of claim 1 wherein said alcohol is diethylene glycol and said alkali metal is sodium.

3. The method of claim 1 wherein said catalyst is cadmium oxide employed in an amount providing the equivalent of 0.2 to 20 gram atoms per 100 mols of alkylene oxide oligomer.

4. The method of claim 1 wherein said catalyst comprises as the cadmium moiety such cadmium moiety separated and recovered from a previous similar dehydrogenation reaction.

5. The method of claim 1 wherein said alkali metal hydroxide is employed in an amount in the range of 5 percent to 30 percent in excess of the theoretical stoichiometric requirement for the complete conversion of the alcohol.

6. The method of claim 1 wherein said water is present in an amount in the range of 25 percent to 35 percent by weight of the total weight of reactants.

7. The method of preparing sodium oxydiacetate by the caustic dehydrogenation of diethylene glycol in the presence of catalyst comprising cadmium in the plus two oxidation state and at conditions including a total pressure of about 85 psig, temperature of about 400°F., a time of about 2 hours; further characterized in that the hydrogen partial pressure is less than 25 percent of the total pressure and water is present in an amount in the range of 25 percent to 35 percent by weight of the reaction mixture.

* * * * *